Patented Oct. 30, 1923.

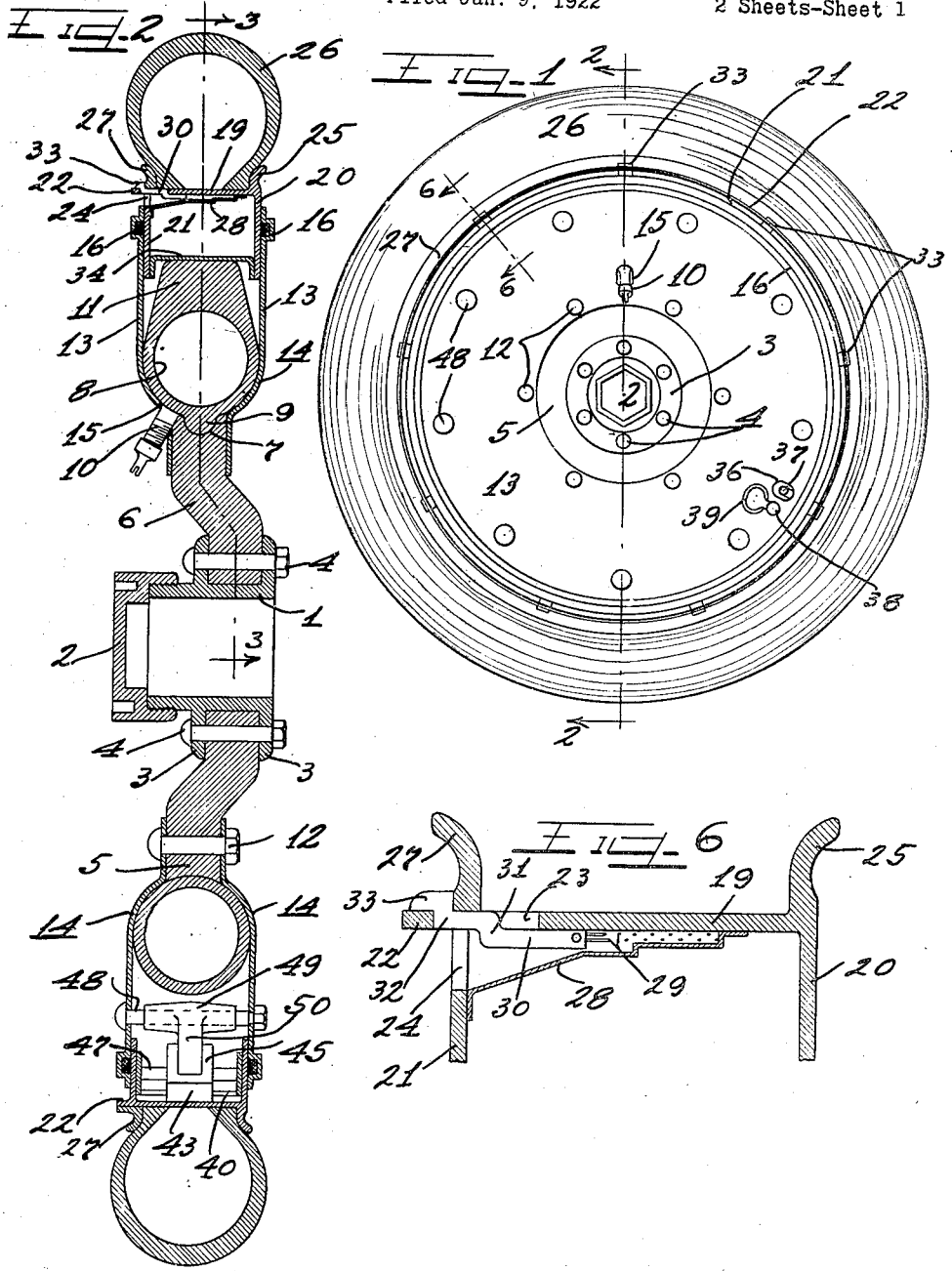

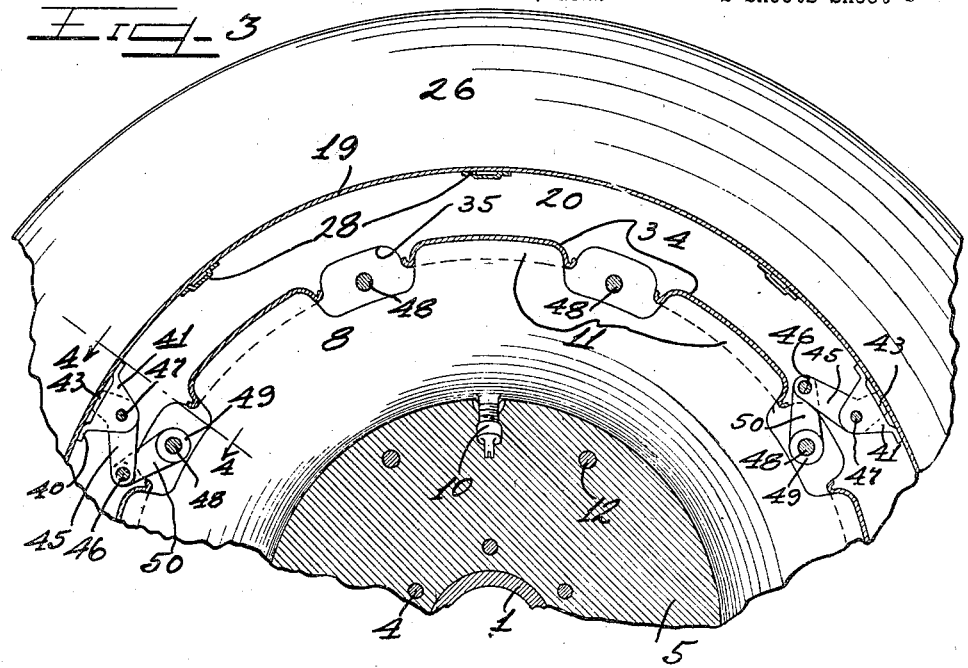
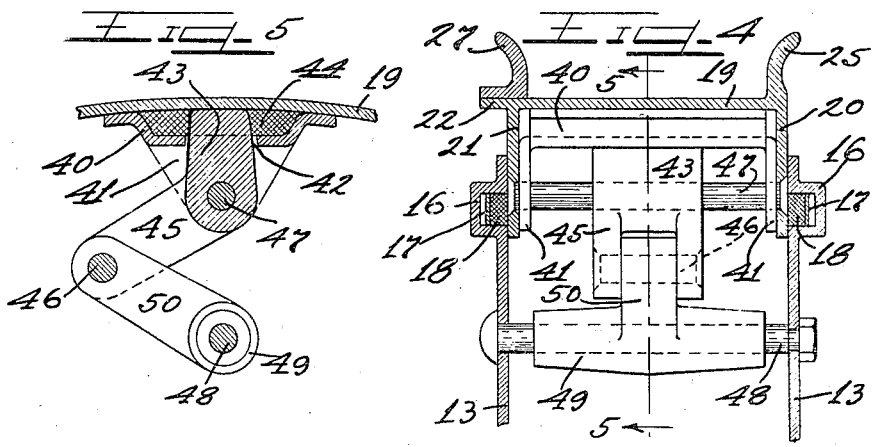

1,472,271

UNITED STATES PATENT OFFICE.

WILLIAM G. HAWKINS AND VIVIAN C. BLOODGOOD, OF HARVEY, ILLINOIS, ASSIGNORS OF ONE-THIRD TO FREDERICK P. HAWKINS, OF CHICAGO, ILLINOIS.

ARMORED PNEUMATIC DISK WHEEL.

Application filed January 9, 1922. Serial No. 527,806.

*To all whom it may concern:*

Be it known that we, WILLIAM G. HAWKINS and VIVIAN C. BLOODGOOD, citizens of the United States, and residents of the city of Harvey, in the county of Cook and State of Illinois, have invented certain new and useful Improvements in Armored Pneumatic Disk Wheels, and we hereby declare that the following is a full, clear, and exact description of the same, reference being had to the accompanying drawings, and to the numerals of reference marked thereon, which form a part of this specification.

This invention covers an improved type of an armored pneumatic disk wheel of comparatively light weight having concentric pneumatic tires the felloe of the outer tire resting on the inner tire and connected with the inner tire housing disks by driving mechanisms adapted to permit a drive from the wheel to be imparted to the outer tire.

It is an object of this invention to provide a simplified form of a double tired armored wheel wherein pivotally connected push mechanisms connect the tire supports.

It is also an object of the invention to construct an armored wheel having interfitting tire supporting sections connected to one another at intervals by pivoted members adapted to cause compression of resilient members carried by one of said tire supporting sections whereby a pushing force is exerted to cause rotation of said tire supporting section by the other of said sections.

It is a further object of this invention to provide a light weight armored wheel wherein an outer tire is removably locked on an outer felloe which slidably interfits with an inner tire carrier to be driven thereby through pivoted push mechanisms.

It is an important object of this invention to provide a vehicle wheel having an outer tire carrying felloe resiliently supported on an inner pneumatic tire the housing of which is rigidly secured to a hub supported disk and is connected with said felloe by improved push mechanisms engaging resilient pads carried by the felloe.

Other and further important objects of this invention will be apparent from the disclosures in the specification and drawings.

The invention (in a preferred form) is illustrated in the drawings and hereinafter more fully described.

On the drawings:

Figure 1 is a side elevation of a vehicle wheel embodying the principles of this invention.

Figure 2 is an enlarged section taken on line 2—2 of Figure 1.

Figure 3 is a fragmentary sectional view taken on line 3—3 of Figure 2 with parts in elevation.

Figure 4 is an enlarged fragmentary detail section taken on lines 4—4 of Figure 3.

Figure 5 is a fragmentary detail section taken on line 5—5 of Figure 4.

Figure 6 is an enlarged detail section taken on line 6—6 of Figure 1 illustrating the outer tire lock mechanism.

As shown on the drawings:

The armored pneumatic disk wheel comprises a hub 1 provided with a hub cap 2. Integrally formed on the hub 1 are spaced peripheral flanges 3 having apertures therein through which bolts 4 project for the purpose of rigidly securing to said hub a ring disk 5 made of wood or other suitable light weight material. The ring disk 5 is offset at 6 and has a plurality of recesses or pockets 7 formed in the outer peripheral concave surface thereof.

Engaged around the ring disk 5 is an inner pneumatic tube or tire 8 having integrally formed on the inner periphery thereof lugs or projections 9 adapted to seat in the recesses 7 of the ring disk to prevent creeping of the tire 8 with respect to the ring disk 5. The inner tire 8 is provided with an air valve 10 and with a plurality of solid rubber shoes or blocks 11 integrally formed at spaced intervals on the outer peripheral surface of said tire. Rigidly secured by means of bolts 12 to the opposite sides of the outer margin of the ring disk 5 are the inner margins of two side plates or disks 13 curved at 14 to offer a housing for enclosing the tire 8. One of the side plates 13 is provided with an opening 15 through which the valve 10 projects. Each side plate 13 is provided with an integral projecting channel 16 near the outer periphery thereof. Seated in each channel 16 are crimp springs 17 and strips of packing 18 as illustrated in Figure 4.

Movably engaged between the side plates 13 and around the inner tire 8 is a channel cross-sectioned felloe embracing a rim 19 having integral inwardly directed side flanges 20 and 21 which project inwardly between the side plates 13 and the packing strips 18 thereof. Projecting outwardly at right angles from the felloe side flange 21 where it joins the rim 19 is a rim flange 22 having a plurality of openings therein at equally spaced intervals and communicating with openings 23 in the rim 19 and with openings 24 in the felloe flange 21. Integrally formed at one edge of the rim 19 where it joins the flange 20 is an outwardly directed curved rim flange 25 for retaining an outer pneumatic tire 26 in place upon the felloe rim 19. A tire retaining ring 27 is slidably engaged around the felloe flange 22 and is adapted to co-act with the rim flange 25 to hold the outer tire 26 secured in place on the rim 19. For holding the ring 27 locked in place on the felloe a plurality of lock mechanisms are provided at spaced intervals within the felloe. As illustrated in Figure 6 each ring lock mechanism comprises a housing or casing 28 secured to the rim 19 and the rim flange 21 at the openings 23 and 24. Positioned within the lock casing 28 is a spring 29 one end of which is attached to the inner end of a latch bar 30 deflected at 31 and 32 to permit the head 33 of the latch bar to project through the felloe openings 23 and 24 and through the opening in the rim flange 22 in which position the latch head 33 engages to the outside of the ring 27 to hold the same in place.

Rigidly secured at spaced intervals to the felloe flanges 20 and 21 are a plurality of caps or heads 34 which seat over the shoes or blocks 11 of the inner tire thereby affording a resilient support or cushion for the outer tire felloe. Each of the felloe flanges 20 and 21 are cut away at spaced intervals to afford notches or openings 35. As illustrated in Figure 1, one of the side plates 13 is provided with an opening 36 to permit access to the air valve 37 of the outer tire 26. Pivoted at the point 38 on the side plate 13 is a flap or shutter 39 for closing the opening 36.

For the purpose of causing a drive to be imparted from the wheel hub to the outer tire 26 a plurality of drive mechanisms are provided at spaced intervals between the outer tire felloe and the wheel side plates 13. Each drive mechanism embraces a casing 40 rigidly secured to the inner peripheral surface of the outer tire rim 19 and having a pair of oppositely disposed brackets or arms 41. The casing 40 is provided with an opening 42 through which the short arm 43 of a bell crank projects to engage in an opening provided in a rubber push pad 44 seated within the casing 40. The other arm of the bell crank comprises a yoke arm 45 the tines or arms of which support a pin 46. The bell crank 43—45 is pivotally mounted on a bolt 47 the ends of which project through the arms 41 and through the felloe flanges 20 and 21. Supported by the side plates 13 are bolts 48 on certain of which is pivotally engaged a sleeve 49 having a radially projecting arm 50 integrally formed thereon. The arm 50 projects between the tines of the bell crank yoke arm 45 and is pivotally engaged on the pin 46.

The operation is as follows:

When the armored pneumatic disk wheel is mounted upon a vehicle axle, the weight rests on the portion of the outer tire 26 where it contacts the ground. The felloe flanges 20 and 21 telescope into the wheel disk section between the side plates 13 and act to cause compression of the inner pneumatic tire 8 which serves as a cushion for resiliently supporting the weight of the vehicle.

The spring pressed packing rings 18 in the side plate channels 16 form a tight joint between the side plates 13 and the felloe side flanges 20 and 21 thereby preventing dirt or other matter from entering the interior of the inner tube housing. The outer tire felloe has the caps 34 thereof engaged on the inner tire blocks 11. For the purpose of transmitting a drive from the disk 5 and the inner tube housing 13—13 to the felloe of the outer tire a plurality of drive mechanisms, as illustrated in Figure 5, are located at spaced intervals in the wheel between the inner tire housing and the outer tire felloe. When the housing 13—13 is rotated the arms 50 carried thereby swing outwardly about their pivot bolts 48 toward the rim 19 (Figure 5) thereby causing the bell-crank arms 45 to swing outwardly about the pivot bolts 47 toward the rim 19, thus causing the bell-crank arms 43 to move backwardly or to the right looking at Figure 5 against the rubber pads 44 to rotate the felloe and the outer tire engaged thereon. When the bell-crank arms 45 are caused to swing inwardly, the bell-crank arms 43 are moved in the opposite direction to cause a reverse rotation of the felloe and the outer tire.

To remove the outer tire 26 from the rim 19, the outer tire is first deflated. The latch heads 33 are then pushed inwardly against the action of the springs 29 and at the same time pushing the rim ring 27 inwardly toward the rim flange 25. When the latch heads 33 register with the openings in the flange 22, the latch members are pushed inwardly toward the wheel hub, thereby permitting the rim ring 27 to be pulled off of the rim flange 22. The tire 26 is then adapted to be pulled off of the rim 19.

We are aware that numerous details of construction may be varied through a wide range without departing from the principles of this invention, and we therefore do not purpose limiting the patent granted otherwise than necessitated by the prior art.

We claim as our invention:

1. A vehicle wheel comprising a hub, a disk section supported thereon, an inner tire in said disk section, a felloe telescoped into said disk section and resting on said inner tire, an outer tire mounted on said felloe, and drive mechanisms pivoted on said felloe and connected to said disk section.

2. A vehicle wheel comprising a hub, a disk secured thereto, side plates secured to said disk to form an inner tire housing, an inner tire disposed in said housing, projections formed on the periphery thereof, a felloe telescoping into said housing and resting on said inner tire projections, drive mechanisms pivoted on said felloe and pivotally connected to said housing, and an outer tire engaged on said felloe.

3. An armored vehicle wheel comprising a disk section, an inner tire therein, a felloe movably engaged in said disk section and resting on said inner tire, an outer tire on said felloe, bell-crank mechanisms pivotally supported on said felloe between said disk section and said felloe, and members pivotally supported on said disk section and pivotally connected to said bell-crank mechanisms to cause a drive from said disk section to be imparted to said felloe and to the outer tire.

4. A vehicle wheel comprising a disk section, an inner tire therein, a felloe movably engaged in said disk section and resting on said inner tire, an outer tire on said felloe, a plurality of bell-cranks pivotally-supported in said felloe, a plurality of members pivotally supported in said disk section and pivotally attached to said bell-cranks, and resilient means between the bell-cranks and said felloe.

5. A vehicle wheel comprising an inner tire housing, an outer tire felloe engaged therewith, pivotally connected members connecting said housing with said felloe, casings supported on said outer tire felloe, and resilient pads in said casings engaged by said members.

6. A vehicle wheel comprising a disk section, an inner tire therein, projections integrally formed on said inner tire, a felloe movably engaged in said disk section, a plurality of caps secured therein and resting on said inner tire projections, an outer tire engaged on said felloe, apertured casings secured in said felloe, apertured resilient pads in said casings, members pivotally supported in said felloe and projecting into said casings into the apertures in said resilient pads, and means pivotally supported in said disk section and pivotally connected to said members.

7. In a vehicle wheel, the combination with an inner tire housing and an outer tire felloe, of bell-crank mechanisms pivotally supported on the felloe, and members pivoted on said bell-crank mechanisms and pivotally connected to said housing to permit a drive from the housing to be transmitted to said felloe.

In testimony whereof, we have hereunto subscribed our names in the presence of two subscribing witnesses.

WILLIAM G. HAWKINS.
VIVIAN C. BLOODGOOD.

Witnesses:
CARLTON HILL,
JAMES M. O'BRIEN.